Patented July 18, 1950

2,515,901

UNITED STATES PATENT OFFICE 2,515,901

CONDENSATION PRODUCTS OF BETA-METHYL GLUTACONIC ANHYDRIDE

Otto Schwarzkopf, Elmhurst, N. Y., and Josef Fried, New Brunswick, N. J., assignors, by mesne assignments, to William R. Warner & Co., Inc., New York, N. Y., a corporation of Delaware No Drawing. Application January 9, 1947, Serial No. 721,148

2 Claims. (Cl. 260—344)

This invention relates to condensation products of acyl halides and beta-methyl glutaconic anhydride, and to a process for preparing such products.

The novel products of this invention may be represented according to their structural formulae as follows:

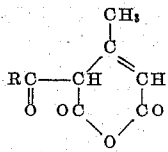

wherein R is an organic radical, for example, an alkyl, aralkyl, aryl, cycloalpihatic or a steroid-like radical.

The novel products are prepared by effecting the condensation of acyl halides and beta-methyl glutaconic anhydride in the presence of tertiary bases at temperatures under 0° C. The reaction may be represented by the following equation:

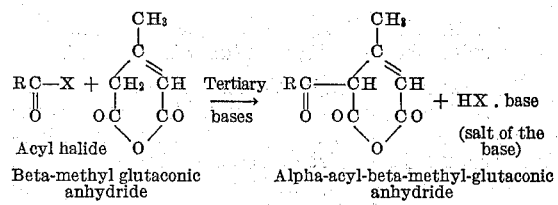

Acyl halide     Beta-methyl glutaconic anhydride     Alpha-acyl-beta-methyl-glutaconic anhydride     (salt of the base)

wherein R is an organic radical and X represents a halogen radical.

Among the acyl halides which may be employed in accordance with this invention are acetyl chloride, benzoyl chloride, piperonylyl chloride, beta,-beta-dimethyl acrylyl chloride, 3-acetoxy-Δ5,6-etiocholenyl chloride, or the corresponding bromides and iodides.

Tertiary bases which may be used in the process include pyridine, the picolines, the lutidines, quinoline, dimethyl aniline and the toluidines.

The condensation reaction of this invention is conducted preferably at temperatures substantially below 0° C., temperatures of the order of —10° C. to —20° C. having been found desirable.

In order to achieve maximum yields and purity, it is quite important that the correct reaction time be employed for each acyl halide used. Thus, it has been found that the following periods give desirable results for the condensation reaction involving beta-methyl-glutaconic anhydride and the indicated acyl chlorides:

| | | |
|---|---|---|
| Acetyl chloride | minutes | 1 |
| Beta,beta-dimethyl acrylyl chloride | do | 6 |
| 3-acetoxy-Δ5,6-etiocholenyl chloride | days | 1 |
| Piperonylyl chloride | do | 1–2 |
| Benzoyl chloride | do | 2–3 |

The products of this invention are useful as intermediates in the preparation of numerous organic chemicals, and, in particular, are valuable in the synthesis of biologically-active substances.

The following examples are given in order more fully to illustrate this invention. All operations were performed in an atmosphere of pure nitrogen and temperatures given are in degrees centigrade.

EXAMPLE I

*Preparation of alpha - (beta-ionylideneacetyl) - beta-methyl glutaconic anhydride*

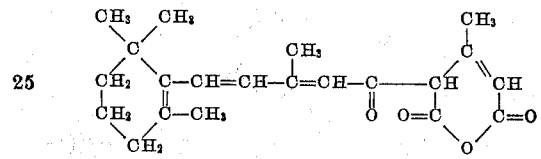

All operations were performed in an atmosphere of dry nitrogen.

Beta-ionylideneacetic acid, melting point 123.5° C.–125.5° C., (1.35 grams, 0.00577 mole) was dissolved in 10 ml. dry benzene. To this was added phosphorus trichloride (0.25 ml., 0.0028 mole) dropwise at room temperature with shaking. The reaction mixture was then kept at room temperature for 0.5 hour. Another 0.25 ml. portion of PCl₃ was added as above and the mixture kept at room temperature for 0.5 hour. Finally, it was heated 1 hour in a 40° C. bath and then refrigerated overnight (about 16 hours).

The reaction mixture was centrifuged, the clear yellow solution decanted from the gelatinous precipitate and the decantate concentrated in vacuo (bath below 40° C.). The residue was dissolved in dry benzene, reconcentrated as above, and the residue finally maintained for 1 hour at 1 mm. in a bath of about 35° C.–40° C. The thick, amber residual liquid acid chloride weighed 1.45 grams (theory, 1.46 grams). It had an index of refraction, $n_D^{25}=1.5913$ and distills at 70° C. at 0.7 micron.

To this acid chloride were added 3 ml. of dry dioxane and 0.74 gram (0.0059 mole) of beta-methyl-glutaconic anhydride. The solution was placed into a —15° C. bath and before precipitation began (less than a minute), dry pyridine (6.5 ml.), pre-cooled to —15° C. was added in one portion by pumping with nitrogen pressure. The contents were mixed well and then kept at —15° C. to —10° C. for 20 minutes.

Ice (about 10 ml.) was added and the solution poured into an ice-cold mixture of 8.5 ml. conc. HCl, 20 ml. ice, and 20 ml. ether. The layers were separated and the acidic aqueous layer extracted with 3 x 25 ml. of ether. The combined ether extracts were washed with 10% HCl (1 x 15 ml.) and then with H₂O (3 x 15 ml.).

The washed and dried (anhydrous Na₂SO₄) extract was concentrated in vacuo (bath below 40° C.) to a residual red oil. This was dissolved in benzene and the solution reconcentrated. The residue was dissolved in pentane (about 30 ml.) and the solution refrigerated 5 hours. The supernatant liquid was decanted and the crystalline solid which had formed washed with pentane by decantation. It weighed 0.8 gram and had an unclear melting range of about 100° C.–102° C., uncorrected. Recrystallizations from benzene-pentane led to the pure compound. It consisted of yellow needles, melting point 109° C.–109.5° C., corrected, which produced a purplish-brown color with FeCl₃.

|  | $C_{21}H_{26}O_4$ | M. W. |
|---|---|---|
| Cal | C, 73.66 | H, 7.66% |
| Obs | C, 73.65 | H, 7.36% |

EXAMPLE II

*Preparation of alpha-acetyl-beta-methyl glutaconic anhydride*

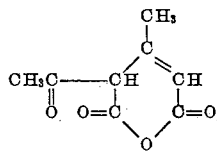

1 gram of beta-methyl glutaconic anhydride was dissolved in 10 grams of pyridine (dried over BaO) and cooled to —20° C. To this solution was added a solution of 0.66 gram (0.6 cc.) acetyl chloride in 5 cc. of pyridine precooled to —20° C. Immediately a precipitate formed and the solution turned green. After reacting for 1 minute the mixture was worked up. 100 cc. of ice-water were added, then 20 cc. of conc. HCl. A dark green precipitate formed which after cooling in ice was filtered off. One recrystallization from 95% alcohol gave fine needles M. P. 130°–131° C., yield, 550 mg.

EXAMPLE III

*Preparation of alpha-benzoyl beta-methyl glutaconic anhydride*

3 grams of beta-methyl glutaconic anhydride were dissolved in 15 cc. of dry C. P. pyridine (dried over BaO) which had been chilled to —20° C. and a solution of 3 cc. of redistilled benzoyl chloride in 10 cc. of pyridine of —20° C. was poured in rapidly. The mixture turned green instantaneously and a precipitate of pyridine hydrochloride appeared. After keeping at —15° C. to —20° C. for 1 hour, the mixture was kept in the refrigerator for 48 hours, and then diluted with an equal volume of ice. This solution was poured with stirring into 30 cc. of concentrated hydrochloric acid containing 50 cc. of ice. The green precipitate was filtered, washed with ice water and dried. Recrystallization from ethyl acetate gave fat prisms, which melted at 101°–103° C., and gave a purple coloration with ferric chloride in alcohol.

Analysis.—Calc'd for $C_{13}H_{10}O_4$: C, 67.8; H, 4.4. Found: C, 67.9; H, 4.2.

EXAMPLE IV

*Preparation of alpha-piperonylyl beta-methyl glutaconic anhydride*

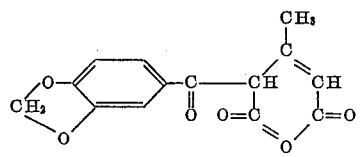

To a solution of 7.6 grams of beta-methyl glutaconic anhydride in 30 cc. of absolute pyridine was added a solution of piperonylyl chloride (from 10 grams of piperonylic acid and thionyl chloride) in 20 cc. benzene with stirring and cooling to —15° C. 10 more cc. of pyridine were added and the reaction mixture was kept in the refrigerator for 24 hours. At the end of this period, chloroform was added and the mixture extracted with 50 cc. concentrated hydrochloric acid and 100 grams of ice. A good deal of piperonylic acid deposited during this procedure and this was removed by filtration. The chloroform solution was washed with water and evaporated to dryness in vacuo. The residue contained the desired alpha-piperonylyl-beta-methyl glutaconic anhydride together with some piperonylic acid. The mixture gave a strong coloration with ferric chloride in alcohol.

EXAMPLE V

*Preparation of alpha-(beta,beta-dimethyl acrylyl)-beta-methyl glutaconic anhydride*

2.2 grams of beta,beta-dimethyl acrylyl chloride and 2.4 grams of beta-methyl glutaconic anhydride were dissolved in 3 cc. of absolute dioxane (refluxed and distilled over sodium). To this solution was rapidly added 11 cc. of pyridine cooled to —15° C. The mixture warmed up spontaneously and was immediately cooled in an ice salt bath. After 6 minutes the green solution was diluted with 20 cc. of ice water and poured with stirring into a mixture of 15 cc. of concentrated hydrochloric acid and 20 cc. of ice. A light green crystalline precipitate formed, which was filtered and washed with ice water. After drying in vacuo, 3.1 grams of crude product was obtained, which was purified by dissolving it in anhydrous ether, decanting off from the green resin and evaporating the solution to about 30 cc. From this solution stout yellow prisms crystallized, which melted at 88° C.–90° C. An overall yield of 1.9 grams of pure product was obtained (50%). The substance produced a purple coloration with ferric chloride in alcohol, and dissolved readily in sodium bicarbonate solution.

Analysis.—Calc'd for $C_{11}H_{12}O_4$: C, 63.5; H, 5.8. Found: C, 63.5; H, 6.1.

EXAMPLE VI

*Preparation of alpha-(3-acetoxy - Δ5,6 - ethiocholenyl-beta-methyl glutaconic anhydride*

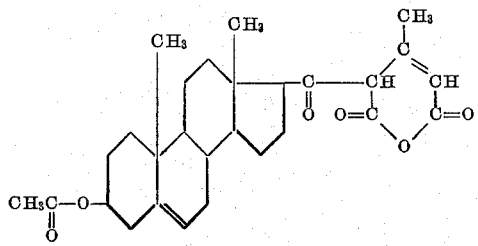

2.5 grams of pure, finely powdered 3-acetoxy-Δ5,6-etiocholenic acid (M. P. 230°–236°.) were kept at 0° C. with 10 cc. of pure thionylchloride. At the end of 5 hours the light yellow solution was evaporated to dryness in vacuo. 4 cc. of dry chloroform was added to the crystalline residue and evaporated in order to remove the last traces of thionyl chloride. The crystals melted partially at 158° C., leaving an unmelted residue to as high as 200° C.

The crystalline 3-acetoxy - Δ5,6 - etiocholenyl chloride was dissolved in 4 cc. chloroform and 940 mg. of beta-methyl glutaconic anhydride were added. To this solution was added 20 cc. of pyridine of —20° C. and the yellow solution kept at —20° C. for one half hour. While in the refrigerator for the next 44 hours, the solution slowly turned green and deposited some solid material. 30 cc. of ice water were added and the mixture poured into 25 cc. of concentrated hydrochloric acid and 50 cc. of ice covered with 200 cc. of ether. A solid precipitate formed between the two layers which was removed by filtration. The precipitate consisted of fine platelets, which were very difficultly soluble in all common solvents. They were recrystallized from much chloroform, and did not melt up to 265° C. They represent the anhydride of 3-beta-acetoxy-Δ5,6-etiocholenic acid.

Analysis.—Calc'd for $C_{44}H_{62}O_7$: C, 75.2; H, 8.9. Found: C, 74.8; H, 8.2.

The ethereal layer was extracted once more with dilute hydrochloric acid and then with water until no more blue color went into the aqueous layer. After drying, the ether solution was brought to small volume and the alpha-(3-acetoxy-Δ5,6-etiocholenyl)-beta-methyl glutaconic anhydride crystallized readily. Altogether 2.3 grams of crystalline product, melting at 140° C. with decomposition were obtained (70.5% yield). Recrystallization of this product from ether-pentane yielded rosettes of fine needles.

Analysis.—Calc'd for $C_{28}H_{36}O_6$: C, 71.8; H, 7.3. Found: C, 71.8; H, 7.6.

Though the novel compounds disclosed and claimed herein are represented by structural formulae of the general type:

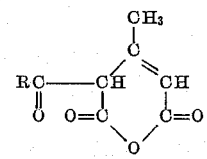

it will be understood by those skilled in the art that our novel products are such that they cannot be represented entirely by a single structural formula. Instead, because of the phenomenon of resonance and because of the possibility of our novel compounds existing as keto-enol tautomers, it is not possible to represent the total chemical configuration of our novel compounds by a single structural formula. These phenomena are recognized by those skilled in the art as applying to beta-methyl glutaconic anhydrides, of which our compounds may for present purposes be considered as derivatives.

Consequently, it will be understood that our disclosure is to be construed as including resonance hybrids and keto-enol tautomers corresponding to the compounds characterized by the structural formulae given.

The foregoing illustrates the practice of this invention, which however, is not to be limited thereby but is to be construed as broadly as permissible in view of the prior art and limited solely by the appended claims.

We claim:

1. Alpha - (beta - ionylideneacetyl) - beta-methyl glutaconic anhydride, which is represented by the formula:

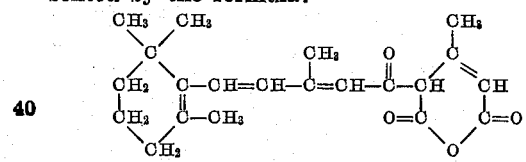

2. The process for making alpha-(beta-ionylideneacetyl)-beta-methyl glutaconic anhydride, which comprises treating beta-ionylideneacetyl chloride with beta-methyl glutaconic anhydride in the presence of pyridine at a temperature between about —15° C. and about 0° C.

OTTO SCHWARZKOPF.
JOSEF FRIED.

REFERENCES CITED

The following references are of record in the file of this patent:

FOREIGN PATENTS

| Number | Country | Date |
|---|---|---|
| 215,240 | Switzerland | Sept. 1, 1941 |

OTHER REFERENCES

Chemical Abstracts, vol. 33, 1669 (1939).